United States Patent [19]

Kano et al.

[11] Patent Number: 4,607,097

[45] Date of Patent: Aug. 19, 1986

[54] DICHROMATIC COLORING MATTER FOR A COLORED LIQUID CRYSTAL DISPLAY ELEMENT

[75] Inventors: Mitsuru Kano; Yoshinori Kato; Yoshimi Kamijo, all of Furukawa; Yoshio Takeda, Himeji; Yoshinari Sakikubo, Hyogo; Naoki Yagi, Himeji, all of Japan

[73] Assignees: Alps Electric Co., Ltd.; Sanyo Color Works Ltd., both of Japan

[21] Appl. No.: 616,722

[22] Filed: Jun. 4, 1984

[30] Foreign Application Priority Data

| Jun. 3, 1983 | [JP] | Japan | 58-98057 |
| Jul. 19, 1983 | [JP] | Japan | 58-130364 |
| Jul. 19, 1983 | [JP] | Japan | 58-130365 |
| Jul. 22, 1983 | [JP] | Japan | 58-132910 |
| Jul. 23, 1983 | [JP] | Japan | 58-133581 |

[51] Int. Cl.$^4$ .......................... C09K 3/34; G02F 1/13
[52] U.S. Cl. ............................... 534/577; 534/567; 534/657; 534/658; 546/37; 252/299.1; 350/349
[58] Field of Search .............. 546/37; 534/577, 657, 534/658; 252/299.1; 350/349

[56] References Cited

U.S. PATENT DOCUMENTS

| 4,262,851 | 4/1981 | Graser et al. | 241/16 |
| 4,378,302 | 3/1983 | Aftergut et al. | 252/299.5 |

FOREIGN PATENT DOCUMENTS

| 42819 | 12/1981 | European Pat. Off. | 252/299.1 |
| 47027 | 3/1982 | European Pat. Off. | 252/299.1 |
| 68427 | 1/1983 | European Pat. Off. | 252/299.1 |
| 1104688 | 4/1961 | Fed. Rep. of Germany | 534/657 |
| 3145711 | 5/1983 | Fed. Rep. of Germany | 252/299.1 |
| 3148206 | 6/1983 | Fed. Rep. of Germany | 252/299.1 |
| 1377362 | 9/1964 | France | 534/657 |
| 57-167352 | 10/1982 | Japan | 252/299.1 |
| 1056299 | 1/1967 | United Kingdom | 534/657 |

OTHER PUBLICATIONS

Leslie, T. M., et al., Liq. Crystals and Ordered Fluids, vol. 4, Griffin, A. C. et al., ed., Plenum Press, N.Y., pp. 43-55, 1984, Proceedings of ACS Symposium held Mar. 29-Apr. 1, 1982 in Las Vegas, Nevada.

Primary Examiner—Teddy S. Gron
Attorney, Agent, or Firm—Guy W. Shoup

[57] ABSTRACT

A dichromatic coloring matter for a colored liquid crystal display element comprising a compound of the general formula:

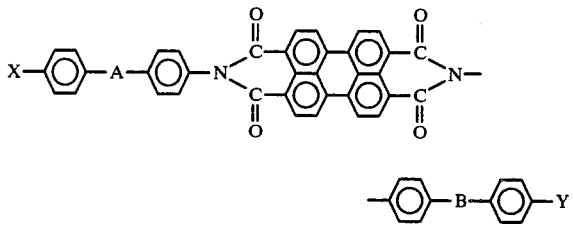

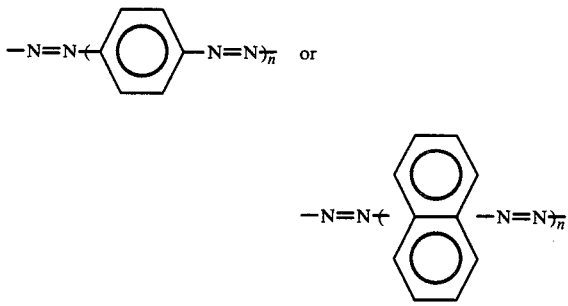

where A and B each stand for where n is 0, 1, 2, 3 or 4, and X and Y each stand for

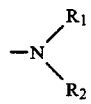

where $R_1$ and $R_2$ stand for an alkyl group or hydrogen, —R (alkyl group) or —OR (alkoxy group).

3 Claims, No Drawings

DICHROMATIC COLORING MATTER FOR A COLORED LIQUID CRYSTAL DISPLAY ELEMENT

BACKGROUND OF THE INVENTION

1. Field of the Invention

This invention relates to a dichromatic coloring matter for a colored liquid crystal display element, particularly for a guest-host type colored liquid crystal display element.

2. Description of the Prior Art

Various dichromatic coloring matters are known and principally of the azo, azomethine or anthraquinone type. Dichromatic coloring matters are required to have, among others, a high dichromatic ratio (CR), a high molecular extinction coefficient, a long life and a high degree of solubility in a liquid crystal. The azo and azomethine dyes generally have a high CR value, but a short life. The anthraquinone dyes have a long life, but a relatively low CR value and a lower molecular extinction coefficient than the azo and azomethine dyes. Therefore, none of these three types of dyes are satisfactory for guest-host type colored liquid crystal display elements. The CR value is particularly important, as it determines the contrast of a display obtained by a guest-host type colored liquid crystal display element. Although the known azo and azomethine dyes are said to have a high CR value, they have a maximum CR value of only 12. A still higher CR value is essential, and it has been desirable to develop a dichromatic coloring matter having a CR value of at least 13.

SUMMARY OF THE INVENTION

This invention is characterized by the addition to a liquid crystal composition of a dichromatic coloring matter having a perylene skeleton at its center and an azo, azomethine, carboxyl, azoxy or biphenyl group at its terminal. The dichromatic coloring matters of this invention have the following general formula:

$$X-\bigcirc-A-\bigcirc-N\overset{\overset{O}{\parallel}}{\underset{\underset{O}{\parallel}}{C}}\text{(perylene)}\overset{\overset{O}{\parallel}}{\underset{\underset{O}{\parallel}}{C}}N-$$

$$-\bigcirc-B-\bigcirc-Y$$

wherein both A and B stand for any of (1) to (5) below:

(1)
$-N=N-\bigcirc-N-N\}_n$ or $-N=N-\bigcirc\bigcirc-N=N\}_n$ where n is an integer of 0 to 4;

(2) (center) (terminal)
$-N=CH-\bigcirc-D\}_n$ (center) (terminal)
$-N=CH-\bigcirc\bigcirc-D\}_n$ (center) (terminal) or
$-CH=N-\bigcirc-D\}_n$ (center) (terminal)
$-CH=N-\bigcirc\bigcirc-D\}_n$ where D stands for $-N=N-$, $-CH=N-$ or $-N=N-$
  $\downarrow$
  $O$, and n is 0, 1 or 2;

(3) (center) (terminal)
$-COO-\bigcirc-D\}_x$ (center) (terminal)
$-COO-\bigcirc\bigcirc-D\}_x$ (center) (terminal) or
$-OOC-\bigcirc-D\}_x$ (center) (terminal)
$-OOC-\bigcirc\bigcirc-D\}_x$ where D stands for $-N=N-$, $-CH=N-$, $-N=N-$
  $\downarrow$
  $O$, $-COO-$ or

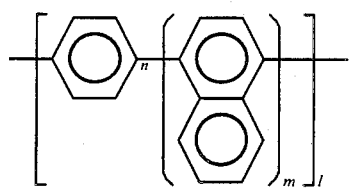

and x, l, m and n are each 0, 1 or 2;

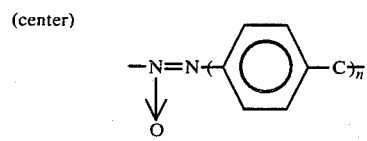

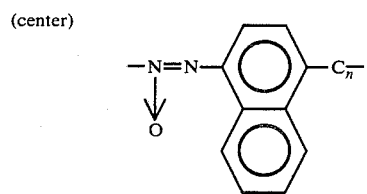

where n is 0, 1 or 2, and C stands for —N=N—, —CH=N— or

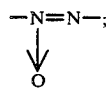

or

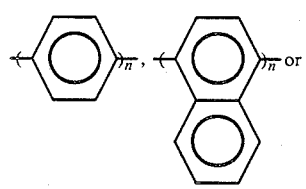

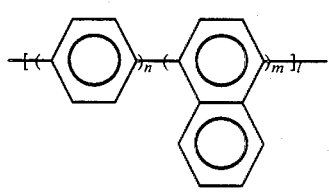

where n, m and l are each 0, 1 or 2; and where X and Y each stand for

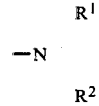

(alkylamino group, where $R_1$ and $R_2$ stand for an alkyl group or hydrogen), —R (alkyl group) or —OR (alkoxy group), or in case A and B stand for any of (3) above, —CN (cyano group).

A particularly important aspect of the molecular structure of these compounds resides in the introduction of an azo, azomethine, carboxyl, azoxy or biphenyl group into a perylene skeleton. In order to obtain a high CR value, it is desirable to form a rigid and elongated molecular structure. The central perylene skeleton is high in rigidity, but not satisfactory in length. This invention makes up this disadvantage by introducing one of the azo, azomethine, carboxyl, azoxy and biphenyl groups which are rigid and elongated, and provides an ideal molecular structure of high rigidity and satisfactory length. The dichromatic coloring matters having such a molecular structure not only have a high CR value, but also fully satisfy all of the other requirements as hereinbefore stated.

The coloring matters of this invention may be used to color, for example, nematic, cholesteric or smectic liquid crystals.

DETAILED DESCRIPTION OF THE INVENTION

The invention will now be described more specifically with reference to a variety of examples thereof and several comparative examples.

A transparent, electrically conductive film composed of an indium-tin oxide was formed on a glass substrate, and covered by an electrically insulating film of silicon dioxide. It was coated with a thin horizontal orientation film of an organic silane, and subjected to rubbing to form a homogeneously oriented liquid crystal cell. A liquid crystal composition was prepared by dissolving 1% of a dichromatic coloring matter in a cyanobiphenyl liquid crystal composition having a positive dielectric anisotropy. The cell was filled with the liquid crystal composition to form a guest-host type colored liquid crystal display element.

A variety of guest-host type colored liquid crystal display elements were prepared by employing various dichromatic coloring matters according to this invention and known in the art as shown in a table below. The table compares this invention and the prior art in a number of respects. In the table, the value of λ max. indicates the wavelength giving the maximum absorption of the coloring matter in the liquid crystal composition, and the solubility is the solubility of the coloring matter in the liquid crystal composition. The light fastness of each sample was examined by the radiation of ultraviolet rays having a radiation intensity which was about 42 times higher than that of ordinary light. The "fading" of color is shown in terms of the hours which passed prior to its fading by 80%, and the "electric current change" in terms of the hours which passed prior to an increase in electric current to three times.

As is obvious from the table, the dichromatic coloring matters of this invention have excellent properties, including a relatively high degree of solubility, a long life and a high CR value.

TABLE

| Sample | Structural formula for dichromatic coloring matter | λmax (nm) | CR | Solubility (%) | Light fastness (Hr) Fading | Electric current change |
|---|---|---|---|---|---|---|
| Example 1 | (C4H9)2N–C6H4–N=N–C6H4–N(CO)2-perylene-(CO)2N–C6H4–N=N–C6H4–N(C4H9)2 | 535 | 14.5 | 2.0 | 200 | 150 |
| Example 2 | (C8H17)2N–C6H4–N=N–C6H4–N(CO)2-perylene-(CO)2N–C6H4–N=N–C6H4–N(C8H17)2 | 535 | 14.7 | 2.0 | 200 | 150 |
| Example 3 | (C4H9)2N–C6H4–CH=N–C6H4–N(CO)2-perylene-(CO)2N–C6H4–N=CH–C6H4–N(C4H9)2 | 500 | 14.3 | 2.0 | 200 | 150 |
| Example 4 | (C8H17)2N–C6H4–CH=N–C6H4–N(CO)2-perylene-(CO)2N–C6H4–N=CH–C6H4–N(C8H17)2 | 500 | 14.4 | 1.8 | 200 | 150 |
| Example 5 | (C4H9)2N–C6H4–N=CH–C6H4–N(CO)2-perylene-(CO)2N–C6H4–CH=N–C6H4–N(C4H9)2 | 500 | 14.7 | 2.0 | 200 | 150 |

TABLE-continued

| Sample | Structural formula for dichromatic coloring matter | λmax (nm) | CR | Solubility (%) | Light fastness (Hr) Fading | Light fastness (Hr) Electric current change |
|---|---|---|---|---|---|---|
| Example 6 | (C8H17)2N–C6H4–CH=N–C6H4–N(CO)2-perylene-(CO)2N–C6H4–N=CH–C6H4–N(C8H17)2 | 500 | 14.7 | 1.5 | 150 | 150 |
| Example 7 | (C4H9)2N–C6H4–OOC–C6H4–N(CO)2-perylene-(CO)2N–C6H4–COO–C6H4–N(C4H9)2 | 470 | 13.6 | 1.0 | 200 | 150 |
| Example 8 | (C8H17)2N–C6H4–OOC–C6H4–N(CO)2-perylene-(CO)2N–C6H4–COO–C6H4–N(C8H17)2 | 470 | 13.8 | 1.0 | 200 | 150 |
| Example 9 | (C4H9)2N–C6H4–OOC–C6H4–N(CO)2-perylene-(CO)2N–C6H4–COO–C6H4–N(C4H9)2 | 470 | 13.5 | 1.0 | 200 | 150 |

TABLE-continued

| Sample | Structural formula for dichromatic coloring matter | λmax (nm) | CR | Solubility (%) | Light fastness (Hr) Fading | Light fastness (Hr) Electric current change |
|---|---|---|---|---|---|---|
| Example 10 | $(C_8H_{17})_2N$–C₆H₄–COO–C₆H₄–N(perylene diimide)N–C₆H₄–OOC–C₆H₄–N$(C_8H_{17})_2$ | 470 | 13.6 | 1.0 | 200 | 150 |
| Example 11 | $(C_4H_9)_2N$–C₆H₄–N=N(→O)–C₆H₄–N(perylene diimide)N–C₆H₄–N(→O)=N–C₆H₄–N$(C_4H_9)_2$ | 540 | 14.7 | 2.0 | 200 | 150 |
| Example 12 | $(C_8H_{17})_2N$–C₆H₄–N=N(→O)–C₆H₄–N(perylene diimide)N–C₆H₄–N(→O)=N–C₆H₄–N$(C_8H_{17})_2$ | 539 | 14.9 | 1.5 | 180 | 150 |
| Example 13 | $(C_4H_9)_2N$–C₆H₄–C₆H₄–N(perylene diimide)N–C₆H₄–C₆H₄–N$(C_4H_9)_2$ | 480 | 15.0 | 2.5 | 200 | 150 |
| Example 14 | $(C_8H_{17})_2N$–C₆H₄–C₆H₄–N(perylene diimide)N–C₆H₄–C₆H₄–N$(C_8H_{17})_2$ | 480 | 14.9 | 2.0 | 200 | 150 |

TABLE-continued

| Sample | Structural formula for dichromatic coloring matter | λmax (nm) | CR | Solubility (%) | Light fastness (Hr) Fading | Light fastness (Hr) Electric current change |
|---|---|---|---|---|---|---|
| Comparative Example 1 | bis(4-aminophenyl) perylene diimide | 510 | 11.5 | 0.8 | 150 | 100 |
| Comparative Example 2 | bis[4-(N,N-diethylamino)phenyl] perylene diimide | 535 | 12.1 | 1.0 | 150 | 100 |
| Comparative Example 3 | 1,4-bis[(4-butoxyphenyl)azomethine]naphthalene | 450 | 8.1 | 3.0 | 150 | 100 |
| Comparative Example 4 | 1-hydroxy-4-(4-butylphenylamino)anthraquinone | 585 | 3.5 | 2.5 | 200 | 30 |
| Comparative Example 5 | bis[4-(N,N-diheptylamino)phenyl] perylene diimide | 535 | 12.1 | 1.0 | 150 | 150 |

What is claimed is:

1. A dichromatic coloring matter for a colored liquid crystal display element comprising a compound of the general formula:

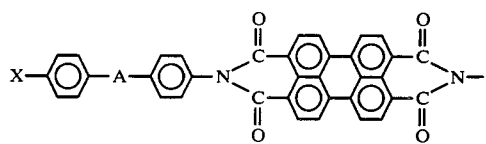

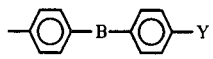

where A and B each stand for

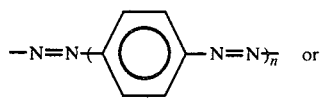 or

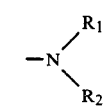

where n is 0, 1, 2, 3 or 4, and X and Y each stand for $$-N\begin{matrix} R_1 \\ R_2 \end{matrix}$$

where $R_1$ and $R_2$ stand for an alkyl group or hydrogen, —R (alkyl group) or —OR (alkoxy group).

2. A dichromatic coloring matter as set forth in claim 1, wherein said compound has a molecular structure of the formula:

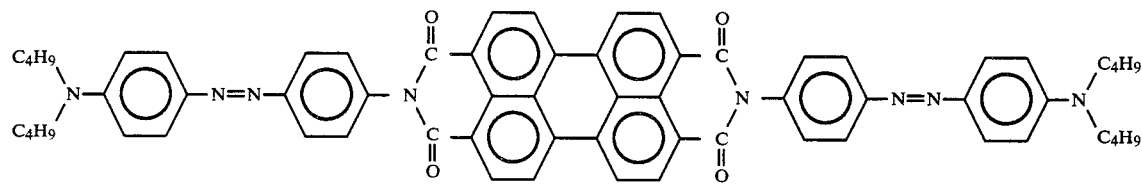

3. A dichromatic coloring matter as set forth in claim 1, wherein said compound has a molecular structure of the formula:

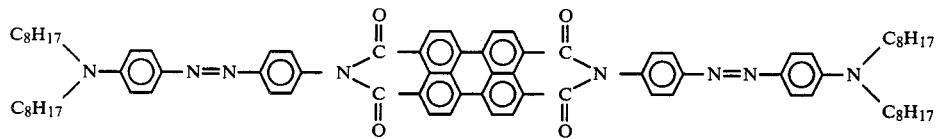

* * * * *